Sept. 23, 1952   C. A. CLARK   2,611,210
ARTIFICIAL BAIT
Filed March 1, 1948

INVENTOR.
C. A. CLARK
BY
A. Yates Dowell
ATTORNEY

Patented Sept. 23, 1952

2,611,210

UNITED STATES PATENT OFFICE 2,611,210

ARTIFICIAL BAIT

Charles A. Clark, Springfield, Mo.

Application March 1, 1948, Serial No. 12,291

2 Claims. (Cl. 43—42.47)

This invention relates to fish bait and more particularly to an artificial lure or bait for use by fishermen and constructed to simulate the action of a minnow or other small fish commonly devoured by larger fish.

This invention is an improvement over that described in my Patent No. 1,981,091.

An object of the invention is to provide an artificial bait having superior performance characteristics including the ability to swim through the water relatively far beneath the surface as compared to other lures, but which produces a comparatively small amount of resistance to the water in order that it may be easily used in connection with a light rod.

Another object of the invention is to provide an artificial lure of simple construction, capable of being easily assembled, and one which is economical to manufacture.

A further object of the invention is to provide an artificial lure in which the number of fastening elements passing into the body thereof is reduced in order to lessen the likelihood of a split being produced in the body.

Figure 1:
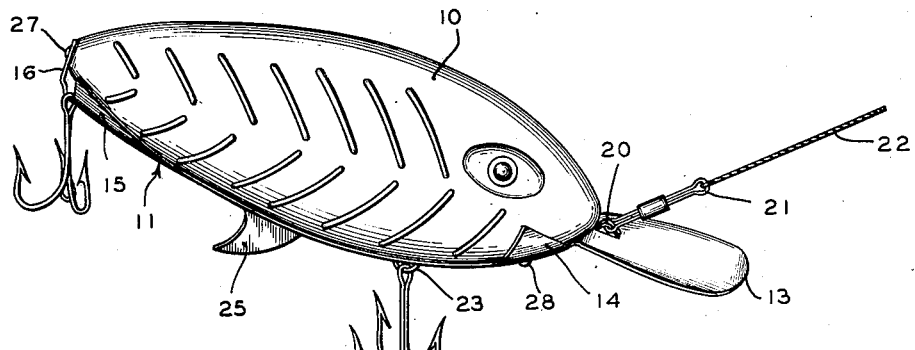
Figure 2:
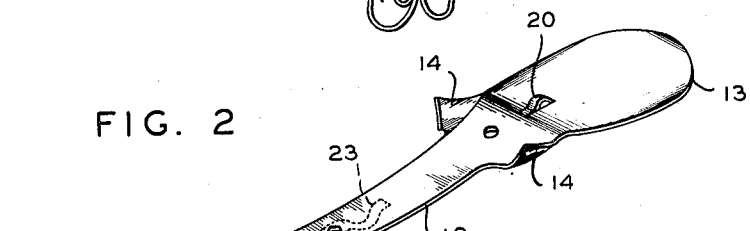
Figure 4:
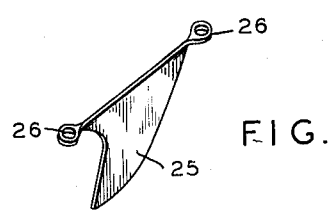
Figure 3:
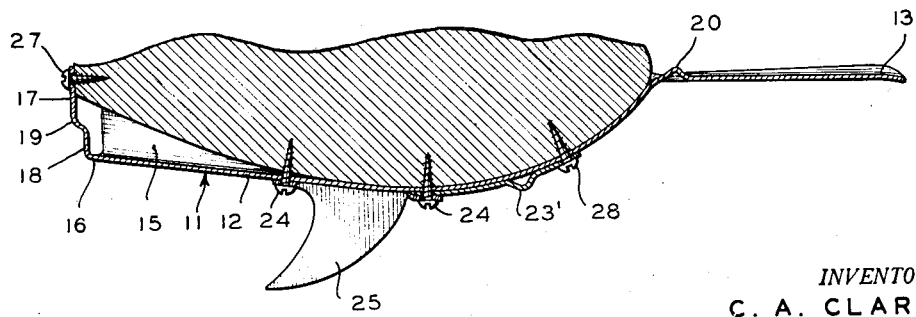

Further objects and advantages of the invention will be apparent from the following description taken in conjunction with the accompanying drawings, wherein:

Fig. 1 is a perspective of the device;

Fig. 2, a perspective of the plate employed with the device;

Fig. 3, a section through a device of modified construction; and,

Fig. 4, a perspective of the fin.

Referring to the drawing, a fish lure in accordance with the present invention is shown in Fig. 1 and includes an elongated body 10 simulating a minnow or the like and having a plate 11 attached to its under side. The plate includes a narrow elongated body portion 12 with a broad extended bill 13 at its forward portion and angular upswept oppositely directed plate-like projections 14 where the bill joins the body portion 12. The projections correspond to the transverse and longitudinal curvature of the adjacent surface portions of the body that the projections contact. The rear portion of the plate tapers outwardly and upwardly to form angular upswept portions 15 and has cut out portions beyond the angular portions to form a relatively narrow neck 16 for supporting a hook. At an angle to the body of the plate the neck has substantially parallel portions 17 and 18 connected by a transverse portion 19. In order that a hook supported by the neck will have a limited movement and may not entangle with another hook carried by the plate, the portion 18 is closely spaced to the rear edges of the upswept portions 15.

The bill of the plate is curved transversely to provide a slight concavity upwardly and at its forward portion is turned slightly downwardly as best shown in Fig. 3, in order that the lure will tend to dive beneath the surface of the water and to be maintained at a relatively deep level. The upswept portions 14 provide additional strength for the bill, and the upswept portions 15 for the rear portion of the plate.

A loop or strap 20 is struck from the bill in order to provide a means for connecting a link 21 to a line 22.

Another strap 23 having a loop portion for receiving a hook-eye is secured by suitable means such as brazing or soldering to the underside of the plate at one end of the loop and at its other end by means of a threaded fastener 24 passing therethrough. A fin 25 as described in my previous invention is likewise adapted to be employed with the device of the present invention and may be stamped from sheet metal and is provided with eyes 26 through which threaded fasteners are adapted to be passed for securing the same to the body of the lure. Additional threaded fasteners 27 and 28 may be provided to firmly secure the plate to the body of the lure.

In the modification shown in Fig. 3, a hook hanger 23' is provided and has a forward connecting portion of somewhat greater length than that of the hanger 23, and has its forward portion secured to the body of the lure by the fastener 28, thus eliminating the step of attaching the hook hanger by the brazing operation at one end.

This device constitutes an improvement over that shown in the patent referred to by reason of its novel configuration, eliminating the need for separable hook hangers passing through the body of the lure and therefore decreasing the likelihood of a split therein. Similarly, the line tie or connecting means is formed from the plate. It has been found that this device is an improvement over the other in performance characteristics as well as simplicity of structure and ease of assembly.

The lure is usually made from wood or the like, and it is contemplated that the plate will be stamped from sheet material which is resistant to corrosion, such as brass, and that the pertinent parts such as the fin and the fasteners will be of stainless steel in order that the entire assembly may be adapted for use in water over a long period of time.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. An artificial lure comprising an elongated body tapering from an intermediate section toward both ends, an elongated plate having a narrow intermediate portion attached to the underside of said body, a relatively broad bill extending from the forward end of said intermediate portion at an obtuse angle thereto, said bill having an integral U-shaped loop struck therefrom adjacent said forward end for attachment of a line and being transversely curved to provide a slight concavity upwardly, said forward end having oppositely directed plate-like projections having transverse and longitudinal curvature throughout their extent corresponding to the adjacent surface portions of the body that the projections contact, and a fastening element extending therethrough into said body and lateral projections bent upwardly into abutting relation with said body, another fastening element extending through said intermediate portion into said body, the portion rearwardly of said other fastening element being spaced from said body and provided with lateral projections bent upwardly into abutting relation with said body, and a narrow neck extending upwardly from the rearward end of said portion in closely spaced relation to the rear edges of said rearward lateral projections whereby a hook supported thereon will have limited movement, said neck having an outwardly offset free end secured to the end of said body.

2. An artificial lure comprising an elongated body tapering from an intermediate section toward both ends, an elongated plate having a narrow intermediate portion attached to the underside of said body, a relatively broad bill extending from the forward end of said intermediate portion at an obtuse angle thereto, said forward end having oppositely directed plate-like projections having transverse and longitudinal curvatures throughout their extent corresponding to the adjacent surface portions of the body that the projections contact, and a fastening element extending therethrough into said body and lateral projections bent upwardly into abutting relation with said body, another fastening element extending through said intermediate portion into said body, the portion rearwardly of said other fastening element being spaced from said body and provided with lateral projections bent upwardly into abutting relation with said body, and a narrow neck extending upwardly from the rearward end of said portion in closely spaced relation to the rear edges of said rearward lateral projections whereby a hook supported thereon will have limited movement.

CHARLES A. CLARK.

REFERENCES CITED

The following references are of record in the file of this patent:

UNITED STATES PATENTS

| Number | Name | Date |
|---|---|---|
| 1,345,600 | Keeling | July 6, 1920 |
| 1,981,091 | Clark | Nov. 20, 1934 |
| 2,429,339 | Arbogast | Oct. 21, 1947 |
| 2,485,179 | Wood | Oct. 18, 1949 |
| 2,486,626 | Arbogast | Nov. 1, 1949 |

FOREIGN PATENTS

| Number | Country | Date |
|---|---|---|
| 611,436 | Great Britain | Oct. 29, 1948 |